March 5, 1929.  F. C. ARMBRUSTER  1,704,161
GAS LINE STOPPER
Filed July 8, 1926
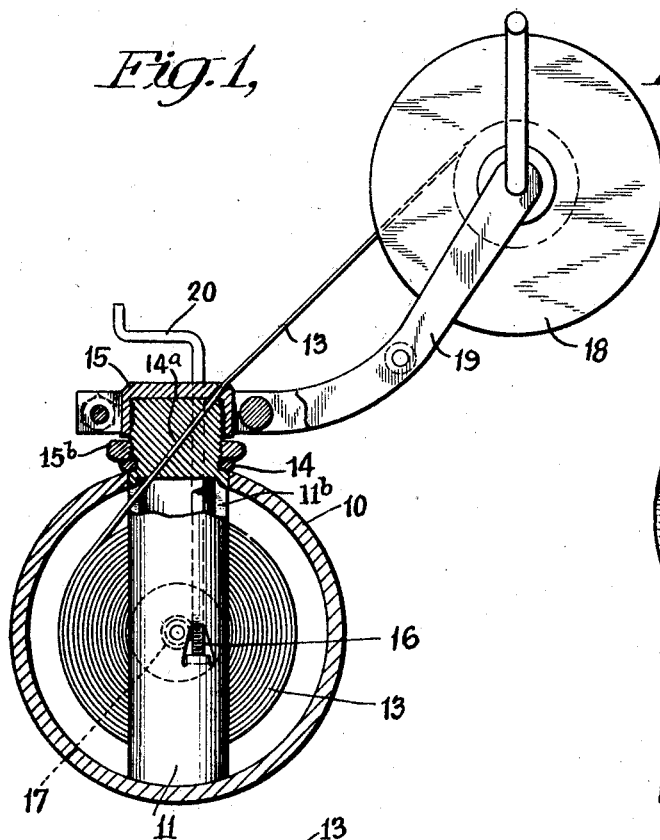
Fig. 1,
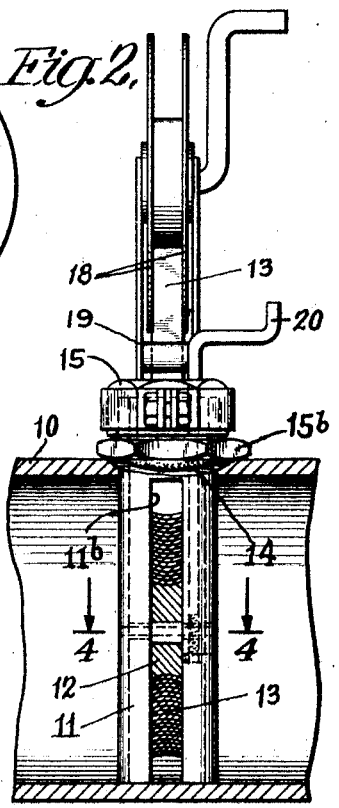
Fig. 2,
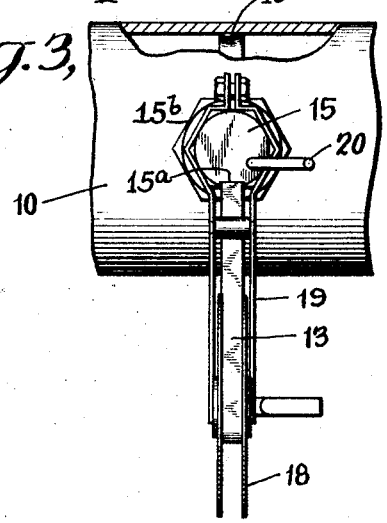
Fig. 3,
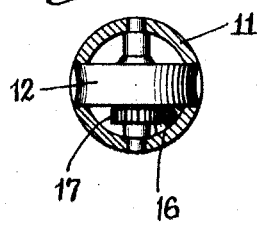
Fig. 4,
Inventor
Frederick C. Armbruster Patented Mar. 5, 1929.

1,704,161

UNITED STATES PATENT OFFICE.

FREDERICK CHARLES ARMBRUSTER, OF SHREVEPORT, LOUISIANA.

GAS-LINE STOPPER.

Application filed July 8, 1926. Serial No. 121,221.

This invention relates to methods and means for making a partition or seal in a pipe or conduit in order to separate one portion of the pipe from another or stop or prevent the flow of fluid from one portion to the other. The invention has particular application in the case of gas pipes or gas mains.

It is often necessary when making repairs in a pipe or main or for other reasons to segregate one portion of the line from the other and to stop the flow of fluid into the isolated portion of the pipe. A primary object of my invention is to provide methods and means by which this may be accomplished.

It is a precarious and difficult operation to effect a stoppage of the flow of fluid with any of the existing devices intended for this purpose, particularly in the case of the larger sizes of pipe, or when there is any considerable pressure in the line or when the gases in the line are of poisonous nature. It is an object of my invention to provide for effecting a closure or seal in the line that is adapted to function satisfactorily even with the larger sizes of pipe, under high pressures and with poisonous gases. The practice of my invention provides a closure in the line of such nature that the flow of fluid is completely stopped even though such fluid may be under high pressure.

A further object of my invention is to provide means adapted for readily forming partitions or closures in lines that is relatively inexpensive, that is substantial in nature and positive in action, compact and easy to manipulate.

Broadly and generally my invention contemplates winding a tape upon a reel within the pipe or conduit, to form a roll that forms a partition in the pipe or conduit. A strip of sealing material is drawn into the pipe and, upon being reeled inside the pipe, produces a roll that in reeling is enlarged or expanded until contact is made with the periphery of the pipe and a sealing partition thus formed.

One aspect of the invention consists in the provision of a tubular member capable of being inserted through a hole made in the pipe or line and carrying a reel or spool. In practicing the invention the tubular member is inserted in a hole in the pipe or conduit and the tape or strip of sealing material is wound upon the reel to form the sealing roll.

In order to more completely disclose the invention reference will now be had to the accompanying drawings which illustrate a preferred embodiment of the invention as applied to a gas main wherein:

Figure 1 is a sectional elevation of apparatus constructed in accordance with the invention and constituting an embodiment thereof. This view shows the tape roll as only partially wound on the reel.

Figure 2 is a partial longitudinal section also showing the tape roll partially wound on the reel.

Figure 3 is a plan view with a portion broken away illustrating the tape roll as completely wound on the reel to form a partition or closure within the pipe.

Figure 4 is a detail section taken on the line 4—4 of Figure 2.

In the drawings 10 represents the gas main or conduit in which it is desired to provide the sealing partition. In practicing the invention a hole is drilled in the line suitable to accommodate a member 11 which carries the reel mechanism and which is inserted within the pipe. The member 11 is preferably of tubular or cylindrical form with the outer end solid and with the inner portion, which is inserted within the pipe 10, of hollow formation.

A reel 12 is suitably mounted in the tubular member 11 and it is preferable to so arrange the position of the reel that it will be substantially co-axial with the pipe 10. A tape or sealing strip 13 is arranged to be wound on the reel 12. The head or solid portion of the member 11 is provided with a slot $14^a$ to permit the passage of the tape or ribbon 13 through the head and the hollow portion is formed with slots $11^b$ to permit the tape 13 to be wound on the reel to thus expand a roll of tape against the periphery of the pipe 10.

The member 11 is shown formed with a groove in which is mounted a packing ring 14, and a threaded washer $15^b$ is provided so as to form a compression joint to prevent leakage of fluid. A nut 15 is provided with a slot or opening $15^a$ for the tape 13.

A crank 20 is provided for operating the reel 12. The stem of the crank extends through holes in the nut 15 and in the head of the tubular member 11 and is suitably geared to the reel 12, as by means of a worm gear 16 at the end of the stem meshing with a spur gear 17 on the reel 12.

A supply reel 18 is provided upon which is wound the tape to be furnished to the reel 12. The supply reel is shown mounted upon a bracket 19 supported upon the member 11 or upon the nut 15.

The tape 13 consists of suitable sealing material and may be formed of rubber composition reinforced, if desired, with wire gauze and the like.

It is preferable to form the reel or spool 12 with a concave periphery, in order that the resultant periphery of the roll of tape thereon will be somewhat concave in form as clearly shown in the drawings. By having the roll of tape of more or less concave periphery the outer edges only of the tape come in contact with the inside perimeter of the pipe. It is thus possible to wind the tape tightly against the pipe with less resistance between the rubbing edges than when the whole surface of the tape is pressed against the pipe, and the two edges tightly wound against the pipe form, I believe, a more secure joint than can conveniently be made by using the entire width of the tape which may not so readily be pressed as tightly against the pipe as the thinner edges. Moreover, there is a tendency for the pressure fluid to curl the outer edge of the tape which facilitates the making of a tight joint. While it is thus satisfactory to form the seal with a narrow line of contact between the tape and pipe it is to be understood that the invention is not by any means limited to this particular arrangement.

Obviously many modifications and variations of the invention, as hereinbefore set forth, may be made without departing from the spirit and scope thereof, and therefore, only such limitations should be imposed as are indicated in the appended claims.

What I claim is:

1. The method of forming a sealing partition in a pipe which comprises winding a tape upon a reel therein.

2. The method of forming a sealing partition in a pipe which comprises drawing into the pipe a strip of sealing material and reeling said strip therein to produce a roll forming a partition in the pipe.

3. The method of forming a sealing partition in a pipe which comprises drawing into the pipe a strip of sealing material and reeling it therein on a reel substantially coaxial with that of the pipe.

4. The method of forming a sealing partition in a pipe which comprises forming a roll of sealing material within said pipe and enlarging or expanding said roll, by reeling, until it comes in contact with the inner periphery of the pipe.

5. A gas line stopper comprising a reel, means adapted to mount the reel in the line and a tape arranged to be wound on said reel.

6. A gas line stopper comprising a tubular member adapted to be inserted through an opening in the line, a reel mounted in said tubular member and a tape arranged to be wound on said reel.

7. A gas line stopper comprising a tubular member adapted to be inserted through an opening in the line, a reel mounted in said tubular member, a tape arranged to be wound on said reel and means for operating said reel adapted to be actuated exteriorly of the line.

8. A gas line stopper comprising a tubular member adapted to be inserted through an opening in the line, a receiving reel mounted in said tubular member, a supply reel, and a tape arranged to be reeled from said supply reel to said receiving reel.

9. In combination with a conduit formed with an opening, a member inserted within said opening, a reel mounted in said member and a tape arranged on said reel as a seal.

FREDERICK CHARLES ARMBRUSTER.